United States Patent
Ludlow et al.

(10) Patent No.: US 9,762,150 B2
(45) Date of Patent: Sep. 12, 2017

(54) SELF-POWERED SENSOR SYSTEM

(75) Inventors: Christopher Charles Ludlow, Ohio, OH (US); Timothy Ryan Gipson, Medford, MA (US)

(73) Assignee: Mide Technology Corporation, Medford, MA (US)

( * ) Notice: Subject to any disclaimer, the term of this patent is extended or adjusted under 35 U.S.C. 154(b) by 1178 days.

(21) Appl. No.: 13/199,922

(22) Filed: Sep. 13, 2011

(65) Prior Publication Data
US 2013/0066594 A1 Mar. 14, 2013

(51) Int. Cl.
*H02N 2/18* (2006.01)

(52) U.S. Cl.
CPC .............. *H02N 2/186* (2013.01); *H02N 2/181* (2013.01)

(58) Field of Classification Search
CPC ......... H02N 2/181; H02N 2/186; G06F 15/00
USPC ............................................ 702/60, 63, 188
See application file for complete search history.

(56) References Cited

U.S. PATENT DOCUMENTS

| | | | |
|---|---|---|---|
| 5,530,302 A | 6/1996 | Hamre et al. | |
| 5,656,882 A | 8/1997 | Lazarus et al. | |
| 6,069,433 A | 5/2000 | Lazarus et al. | |
| 6,404,107 B1 | 6/2002 | Lazarus et al. | |
| 6,420,819 B1 | 7/2002 | Lazarus et al. | |
| 6,442,143 B1 | 8/2002 | Corry | |
| 6,674,222 B2 | 1/2004 | Masters et al. | |
| 6,802,216 B2 | 10/2004 | van Schoor et al. | |
| 7,000,053 B2 | 2/2006 | Ho et al. | |
| 7,571,058 B2 | 8/2009 | Sealing et al. | |
| 7,757,565 B2 | 7/2010 | Chakrabartty | |
| 7,927,292 B2 | 4/2011 | Brown | |
| 2002/0193144 A1 | 12/2002 | Belski et al. | |
| 2008/0047355 A1 | 2/2008 | Chakrabartty et al. | |
| 2008/0073491 A1 | 3/2008 | Fleischman et al. | |
| 2008/0180245 A1 | 7/2008 | Hsu et al. | |
| 2009/0086696 A1* | 4/2009 | Naito et al. | 370/338 |
| 2010/0164711 A1* | 7/2010 | Arms et al. | 340/539.1 |
| 2011/0004444 A1* | 1/2011 | Farrow et al. | 702/187 |
| 2011/0084503 A1 | 4/2011 | Li et al. | |
| 2011/0093729 A1 | 4/2011 | Mucignat et al. | |
| 2011/0241839 A1 | 10/2011 | Lal et al. | |
| 2011/0267190 A1 | 11/2011 | Payson et al. | |
| 2012/0068827 A1 | 3/2012 | Yi et al. | |

OTHER PUBLICATIONS

U.S. Appl. No. 14/063,199, Ludlow et al.
Written Opinion of the International Searching Authority dated Aug. 3, 2012 in International Application No. PCT/US2012/00211 (eight (8) pages total).

* cited by examiner

*Primary Examiner* — Mohamed Charioui
(74) *Attorney, Agent, or Firm* — Iandiorio Teska & Coleman, LLP

(57) ABSTRACT

A self-powered sensor system and sensing method includes a power source generating power which is a function of a first parameter such as vibration. A charge management circuit is responsive to the power output by the power source and is configured to provide, every charge cycle, a supply signal to a controller which activates it to control a transmitter to transmit data at a transmission rate which is a function of the charge cycle. The data and the transmission rate are processed and used to identify a variation in the first parameter by a variation in the transmission rate beyond a predetermined threshold.

32 Claims, 7 Drawing Sheets

| Packet Sequence | Temp. | Time | Packet Transmission Rate |
|---|---|---|---|
| 1 | 72°F | | |
| 1 | 72°F | | |
| 1 | 72°F | | |
| 1 | 72°F | 3.1 | 3.1 |
| 2 | 71°F | | |
| 2 | 71°F | | |
| 2 | 71°F | | |
| 2 | 71°F | 6.4 | 3.3 |
| 3 | 72°F | | |
| 3 | 72°F | | |
| 3 | 72°F | | |
| 3 | 72°F | 9.8 | 3.4 |
| 4 | 72°F | | |
| 4 | 72°F | | |
| 4 | 72°F | | |
| 4 | 72°F | 18.8 | 9.0 |

*FIG. 4*

SELF-POWERED SENSOR SYSTEM

FIELD OF THE INVENTION

The subject invention relates to sensors such as temperature and/or vibration sensors.

BACKGROUND OF THE INVENTION

Piezoelectric devices can be used to produce electrical power when attached to a source of vibrations such as a motor, machine, or the like. The power produced can be used, for example, to power a microcontroller, transmitter, and a sensor. See the data sheet for the Mide Volture™ piezoelectric "Energy Harvester" product incorporated herein by this reference. In this way, the temperature of a motor can be sensed, reported, and monitored without the need for a battery which requires replacement.

Still, there is a need to sense additional parameters using battery-less systems. It is known, for example, to use an accelerometer or microphone to sense vibrations but such devices add to the cost of the system and also consume additional power.

BRIEF SUMMARY OF THE INVENTION

In one aspect, a change in the vibration profile of a vibrating device is detected and reported without the need for a separate vibration sensing device such as an accelerometer which would add to the cost of the system and require additional power.

The subject invention results, at least in part, in one preferred embodiment, from the realization that the power produced by a piezoelectric device, and thus the time required to charge a capacitor of a known capacity to a known voltage level using the power produced is a function of the vibrations (frequency and amplitude) imparted to the piezoelectric device. Consequently, the charge cycle (time) required to power up a controller and transmitter to transmit a signal once the appropriate capacitor voltage level has been reached is also a function of the frequency and amplitude of these vibrations. Thus, if the vibrations change (indicating, for example, wear of a bearing or like), so too does the charge cycle and the time between transmissions. The time between transmissions, then, is an indication of a change in the mechanical properties of a device such as a motor or piece of equipment.

The invention features, in one aspect, a self-powered sensor system comprising a power source generating power as a function of a first parameter, a transmitter for transmitting data, and a controller configured to control the transmitter to transmit the data. A charge management circuit is responsive to the power output by the power source and is configured to provide, every charge cycle, a signal to the controller which activates it to control the transmitter to transmit the data at a transmission rate which is a function of the charge cycle. A receiver receives the transmitted data and a processor is configured to process the data and the transmission rate and to identify a variation in the first parameter by a variation in the transmission rate beyond a predetermined threshold. Preferably, the system also includes a sensor for sending a second parameter and the controller is further configured to control the transmitter to transmit the second parameter in the data.

In one example, power source includes a piezoelectric element and the first parameter is vibration. Then, the power level typically includes a voltage and the supply signal output by the charge management circuit includes a higher turn on voltage. In one design, the charge management circuit includes a storage device (e.g., a capacitor) charged by the voltage until the turn on voltage is reached over the charge cycle. The circuit typically supplies the turn on voltage to the controller. In some versions, the system further includes a power drain activated after the charge cycle to drain the capacitor to a known turn-off voltage.

Typically, the controller generates a new sequence number each charge cycle transmitted as part of the data and the processor is configured to address missing sequence numbers in identifying a variation in the first parameter. Also, the controller may generate multiple transmissions each charge cycle at different transmitter power levels but the transmission rate is tied to subsequent charge cycles (and not individual transmissions at different power levels within a charge cycle). Also, the controller typically includes the power levels in the data and the processor can then be configured to estimate the signal quality of the received transmissions.

One self-powered sensor system in accordance with an example of the invention features a piezoelectric power source generating a supply voltage and current which are a function of vibrations imparted to the piezoelectric power source, a charge management system responsive to the supply voltage and configured to produce, every charge cycle, a turn-on voltage, a sensor for sensing a parameter, and a transmitter for transmitting data including the sensed parameter. A controller is powered on by the supply voltage every charge cycle and is configured to control the transmitter to transmit the data at a transmission rate. A receiver receives the transmitted data and a processor is configured to log the data and the transmission rate and to identify variations in the vibrations by a variation in the transmission rate beyond a predetermined threshold.

A sensing method in accordance with aspects of the invention includes generating power which is a function of a first parameter, activating a transmitter to transmit, every charge cycle, data at a transmission rate which is a function of the charge cycle itself a function of the first parameter, receiving the transmitted data, and processing the transmitted data to log the data and the transmission rate. A variation in the first parameter is identified by a variation in the transmission rate beyond a predetermined threshold. The method may further include sensing a second parameter and transmitting the second parameter in the data.

In one preferred embodiment, the first parameter is vibration and then the power level generated includes a vibration-dependent peak voltage. The method further includes charging a storage element by the supplied voltage until a turn-on voltage threshold is reached over the charge cycle. The method may further include the step of draining a capacitor to a known voltage after each charge cycle. The method may include the step of generating a sequence number each charge cycle transmitted as part of the data, processing the sequence number, addressing variations in the first parameter in response to missing sequence numbers, generating multiple transmissions at different power levels each charge cycle (the transmission rate tied to subsequent charge cycles), indicating the power level in the data, and reporting a signal quality.

One method comprises generating a voltage which is a function of vibrations imparted to a piezoelectric power source, providing every charge cycle an output voltage, transmitting data every charge cycle at a transmission rate, receiving the transmitted data, and processing the data and the transmission rate and identifying variations in vibrations by a variation in the transmission rate beyond a predetermined threshold.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 4 is a view of a report produced by the processor shown in FIG. 1 via the input/output block shown in FIG. 1;

DETAILED DESCRIPTION OF THE INVENTION

Figure 1:
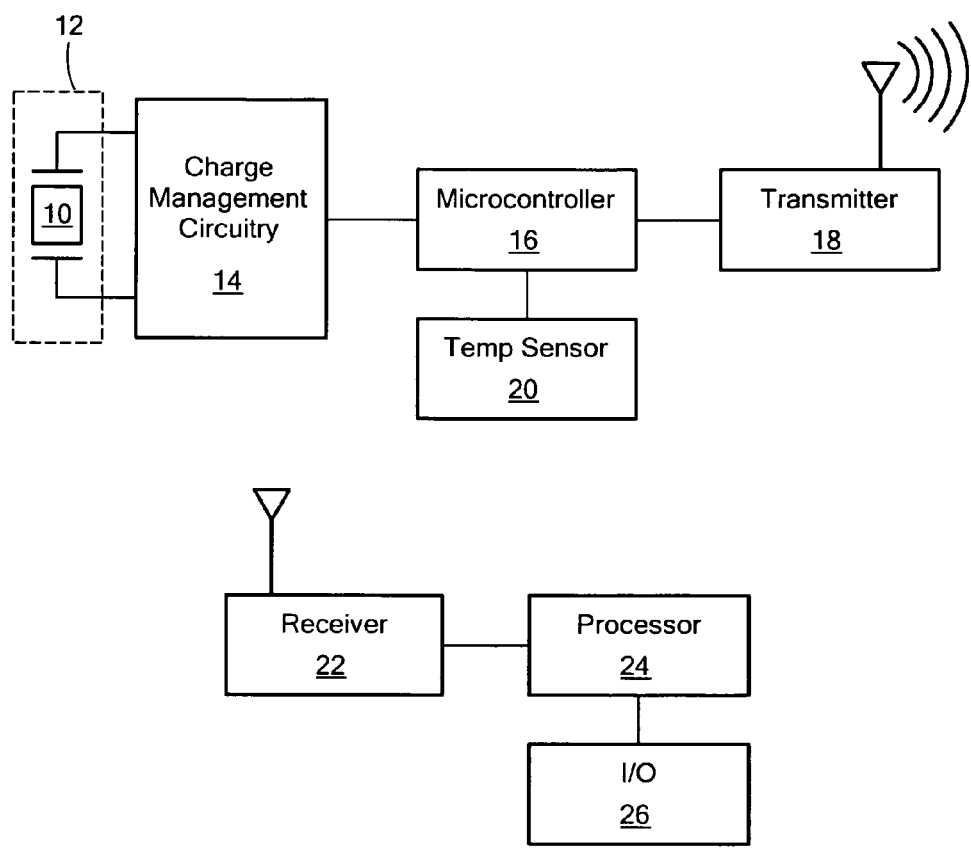
FIG. 1 is a block diagram showing the primary components associated with a specific example of a self-powered sensor subsystem in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts but one example of a self-powered sensor system in accordance with the invention. A power source such as a piezoelectric device 10 is attached to vibrating motor or machine 12 and produces a certain electrical power level as a function of the vibrations of machine 12. An example of a suitable piezoelectric device is the applicant's Volture™ piezoelectric "Energy Harvester" device. Other power sources whose output are dependent on an environmental variable can be used; for example, solar cells and pyroelectric and thermoelectric materials. Charge management circuitry 14 is responsive to the output of piezoelectric device 10 and provides, every charge cycle, a supply voltage to controller 16 which activates it to enable transmitter 18 to transmit data, in this example, temperature data from temperature sensor 20. Components 10, 14, 16, 18, and 20 typically reside on a substrate magnetically secured to a motor or machine 12.

Typically, charge management circuitry 14 includes a voltage conversion circuit configured to step up and rectify A/C voltages (including very low voltages) from piezoelectric device 10. The resulting output is collected on a capacitor until a turn on voltage threshold is reached whereupon an electronic switch is closed connecting the stored energy to controller 16. Every charge cycle, controller 16, in this specific example, upon being powered, step 30, FIG. 2 determines a sequence number, step 32 for its next data packet by incrementing a value stored in memory 34 (e.g., an EEPROM) that persists between power ups. Controller 16, FIG. 1 preferably clears one bit of the EEPROM each time it powers up and counts how many bits are cleared total setting them all again when they run out. This equalizes wear across all the EEPROM cells. In such an embodiment, the sequence number increases by one each time a unique temperature measurement is sent. Controller 16 generates a data packet, step 36, FIG. 2 that includes the unique temperature sensor ID, the sequence number referred to above, the packet transmit power, and the temperature value. In this specific example, the same measurement (and sequence number) is sent four times at four different transmitter power levels: one quarter power, half power, three-quarters power, and full power. The data packets are delivered to the transmitter, step 38 and sent to receiver 22, FIG. 1 to be processed by processor 24 producing reports, graphs, and the like viewable or printable via input/output block 26. Processor 24 and I/O 26 are typically embodied in a laptop type computer or other computer somewhere on or near the manufacturing floor of a facility.

Figure 2:
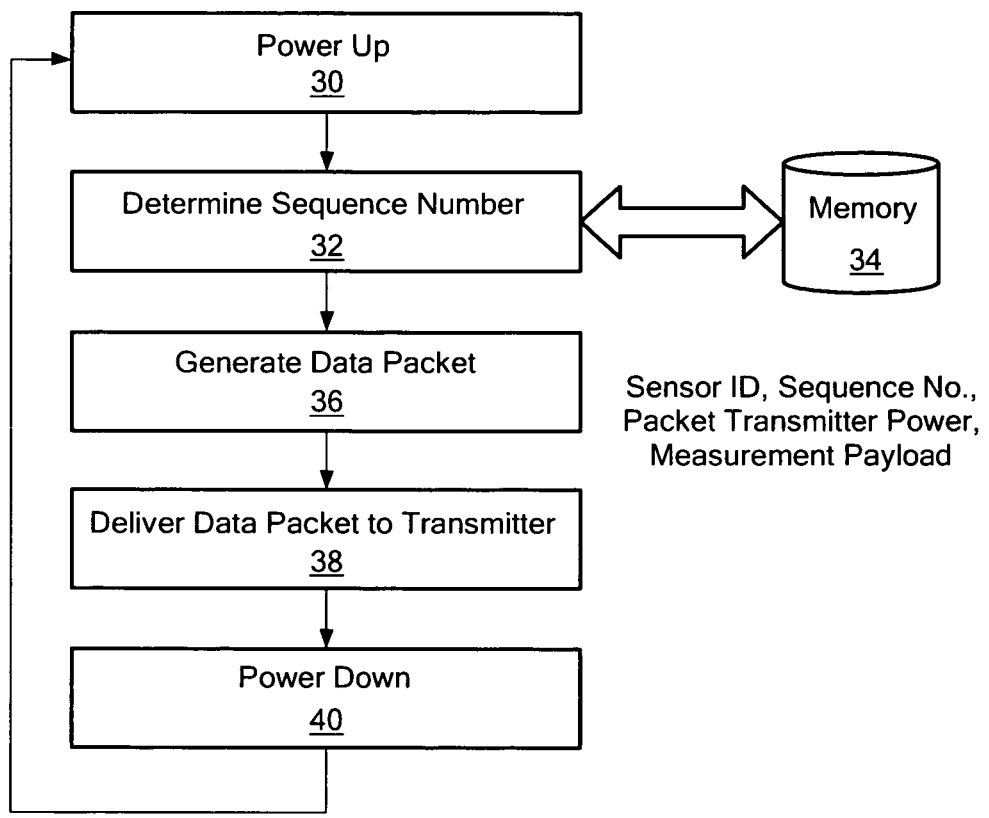
FIG. 2 is a flow chart depicting the primary steps associated with the programming of the microcontroller of FIG. 1.

In step 40, FIG. 2, controller 16, FIG. 1 powers down, in one specific example, by turning on a power consuming device or load such as a light emitting diode to drain the remaining power from the capacitor of the charge management circuitry ensuring the system cycles by allowing the electronic switch to open when the capacitor voltage is depleted to a known fixed "turn-off threshold". The capacitor then refills via the power produced by piezoelectric device 10 for the next charge cycle.

Since the turn-on voltage, capacitor value, and power consumed per measurement are known, the charge cycle time is constant for a given input power rate and is proportional to the rate. Since the power is generated by a cantilevered piezoelectric beam, this rate is determined by the amplitude the piezoelectric beam is vibrating at and the difference between the vibration frequency and the piezoelectric beam's natural frequency. A change in any of these values will alter the charge cycle timing and thus the packet transmission rate.

Processor 24 processes the signals transmitted to receiver 22, collects all measurement packets within range, and correlates measurements for each device according to the unique ID contained in the packet. The time elapsed between packets for each sensing device, the packet transmission rate, is also recorded.

A substantial change in a measurement temperature, vibration frequency, and/or vibration amplitude represents a change in machine operating parameters that may indicate impending failure. Likewise, complete stoppage of the machine under test (a sudden cease in measurement reporting) likely indicates failure.

Figure 3:
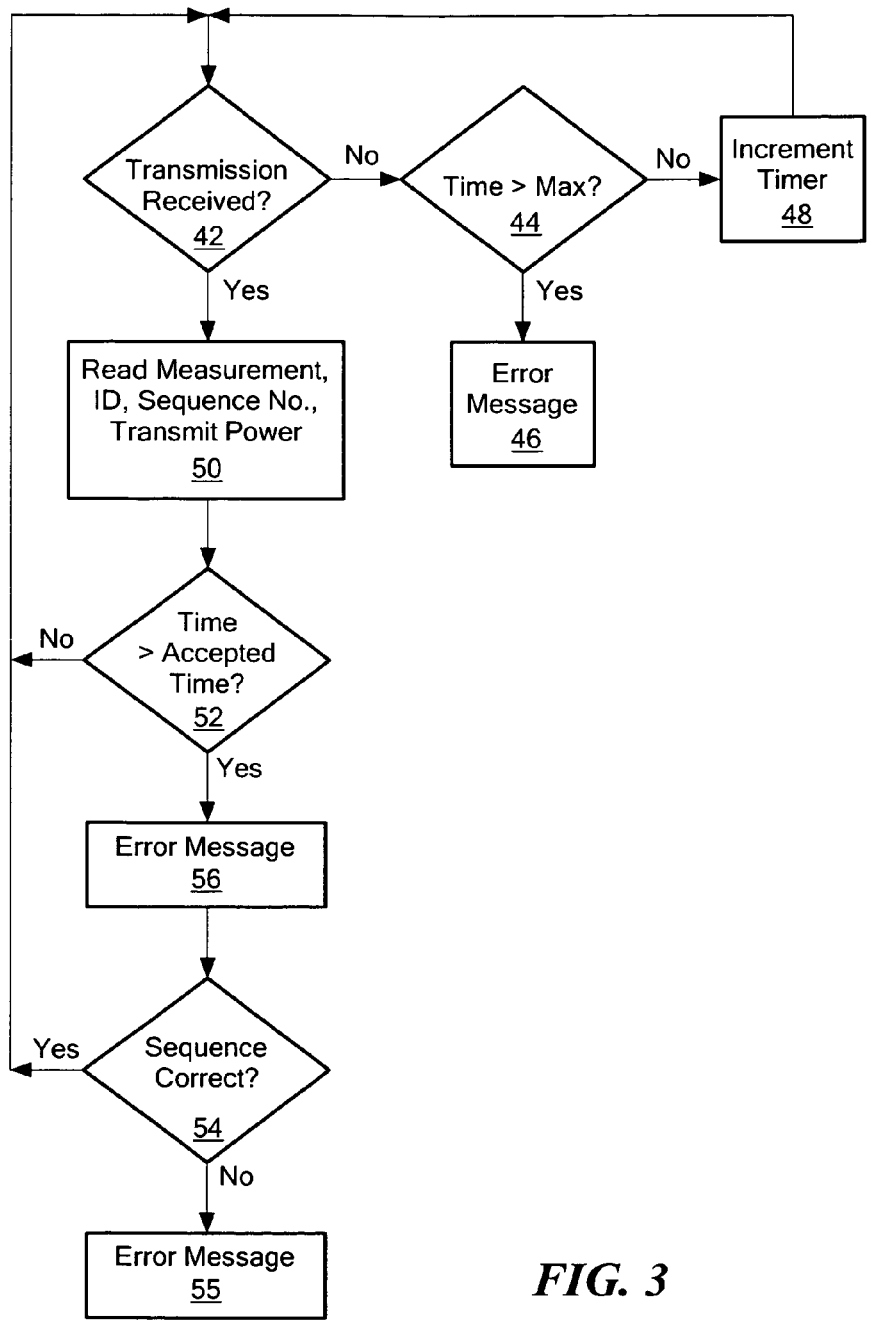
FIG. 3 is a flow chart depicting the primary steps associated with the programming of the processor of FIG. 1.

Processor 24, FIG. 1 thus detects whether a transmission is received, step 42, FIG. 3. If no transmission is received, and the time of the last transmission was beyond some maximum allowed threshold as depicted in step 44, an error message can be displayed, or transmitted, step 46. This is a scenario where a machine has stopped working all together, no vibrations are output by the machine, and thus no power is provided to the microcontroller and the transmitter of FIG. 1. If the time lapsed is not greater than the maximum threshold, then the timer or clock increments, step 48 and for each received transmission, the measurement data, identification data, sequence number and transmit power is read, step 50. If the transmit time or rate is within an acceptable tolerance level, step 52, and the sequence number is correct, step 54, then no action is taken and the data is logged and the next transmission is received. If, however, the transmission rate varies from a predetermined allowed variance at step 52 or if the sequence number is incorrect as shown at step 54, then an error message is displayed, or transmitted (e.g., an email may be sent to manufacturing or reliability personnel) as shown in steps 56 and 55. Preferably, an acceptance band is computed based on the current and historical values (n standard deviations of the last k measurements) upon user demand. Thereafter, measurements (temperature or packet transmission interval) falling outside of the acceptance band trigger some kind of a visible warning or error message. The sequence number is used to differentiate "repeat" measurements (multiple-amplitude packets) from fresh measurements, and allow the interval to be accurately estimated even if all the packets for a given measurement were lost (for example due to interference or a poor signal). The simplest method is by straight line averaging the interval over the difference between the most recent and previously received sequenced numbers.

The signal strength encoding in the data packet is used to estimate the signal quality and can be used to estimate the physical proximity of each sensor to the receiver even if the receiver has no mechanism for directly measuring or reporting signal strength. In a low power TDMA radio scheme, for example, the same method (varying and encoding the signal strength for low-priority data) can be used to estimate signal quality or proximity using less power than conventional methods of taking RSSI samples during a receive event and during idle periods to establish a noise floor value. TDMA radios send periodic beacons (including filler/repeat data) in any case to maintain synchronization but can tolerate some packet loss. Effectively encoding signal strength measurements into this packet loss (by intentionally sending occasional weaker packets) produces the desired measurement. Typically, processor 24, FIG. 1 uses a weighted average of the received packets reported transmit strengths to report estimated transmitter signal quality.

FIG. 4 shows an example of the output produced by processor 24, FIG. 1 where four packet sequences are shown. For each sequence (and charge cycle), there are four transmissions at different power levels as discussed above. Processor 24 keeps track of the time interval between packet sequence transmissions as shown. Between the first and second packet sequence transmissions, the transmission rate was 3.3 seconds. Between the second and third packet sequence transmissions, the packet sequence rate was 3.4 seconds. This was in the accepted time threshold (acceptance band) as shown in step 52 in FIG. 3. Between the third and fourth packet transmissions, however, the transmit rate in FIG. 4 changed to 9.0 seconds. This is outside the band or threshold at step 52, FIG. 3 and, as a result, an error message is displayed (for example, the various reports for packet sequence number four could be displayed in red or the like). Here, the transmission rate was tied to subsequent sequences and thus subsequent charge cycles.

Figure 5:
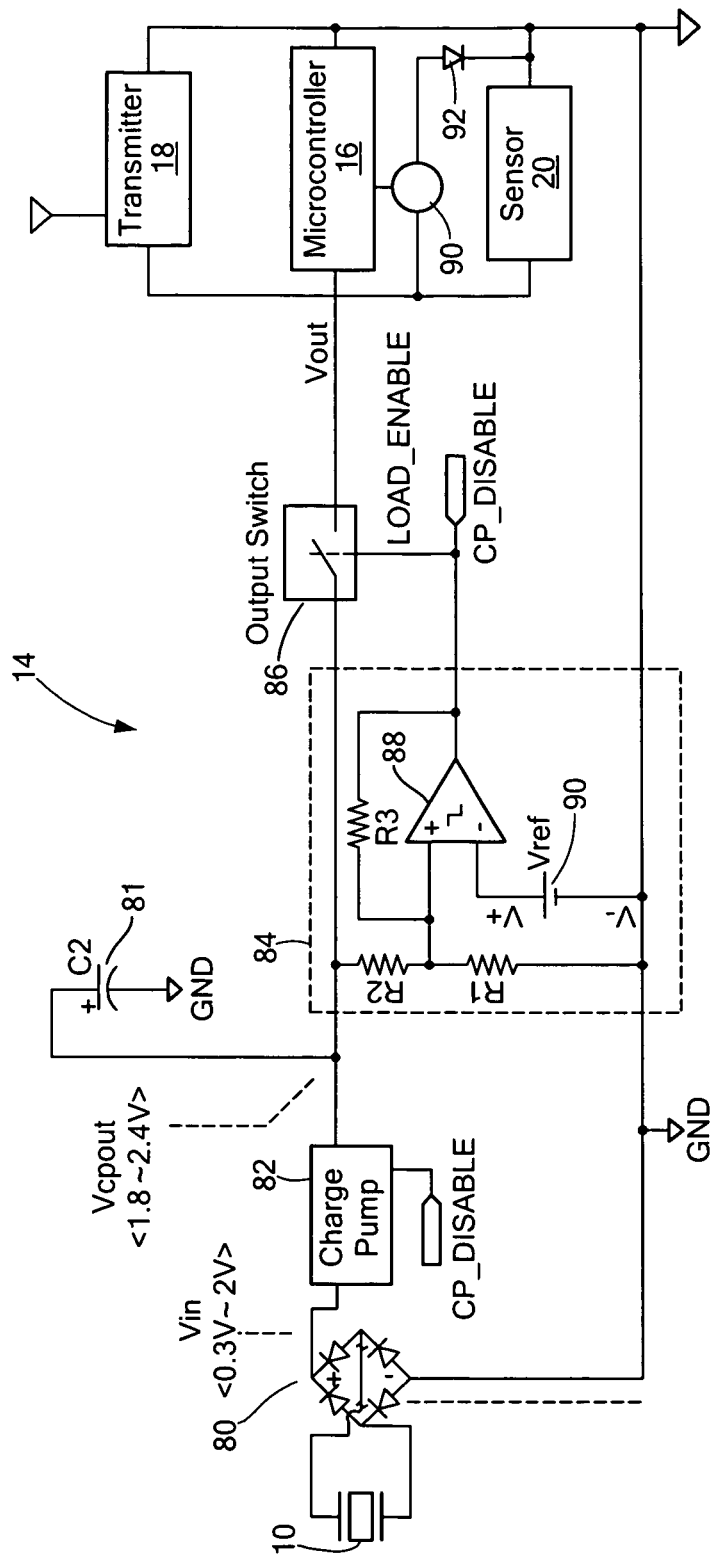
FIG. 5 is a circuit diagram of an example of a self-powered sensor system.

In FIG. 5, the charge management circuit includes rectifier circuit 80 which converts the alternating current output by device 10 to direct current. Charge pump circuit 82 boosts the input voltage to a higher output voltage with enable/disable control. Voltage comparator circuit 84 controls output switch 86 and charge pump operation as described below. The comparator component 88's output will turn on when its positive terminal is at a higher voltage than its negative terminal and turn off when the negative voltage is higher. To set a separate turn-on threshold voltage and turn-off threshold voltage, the negative terminal is connected to a known reference voltage (Vref) 90 and the positive terminal is connected to the node formed by resistors as indicated. The ratio of the resistance values scales down the voltage seen at the positive terminal to be in the range of Vref. R3 provides hysteresis (a difference between turn-on and turn-off voltage) by raising the voltage seen at the positive terminal during the output "on" state and lowering it during the "off" state. Thus, by the choice of R1, R2, R3 and Vref values, an arbitrary turn-on and turn-off threshold voltage can be set. Thus, by the choice of R1, R2, R3 and Vref values, an arbitrary turn-on and turn-off threshold voltage can be set. When the comparator turns on, switch 86 is closed and Vout is provided to controller 16 and the like. When the capacitor 81 voltage drops to Vth.off, switch 86 is closed ending the charge cycle.

Figure 6:
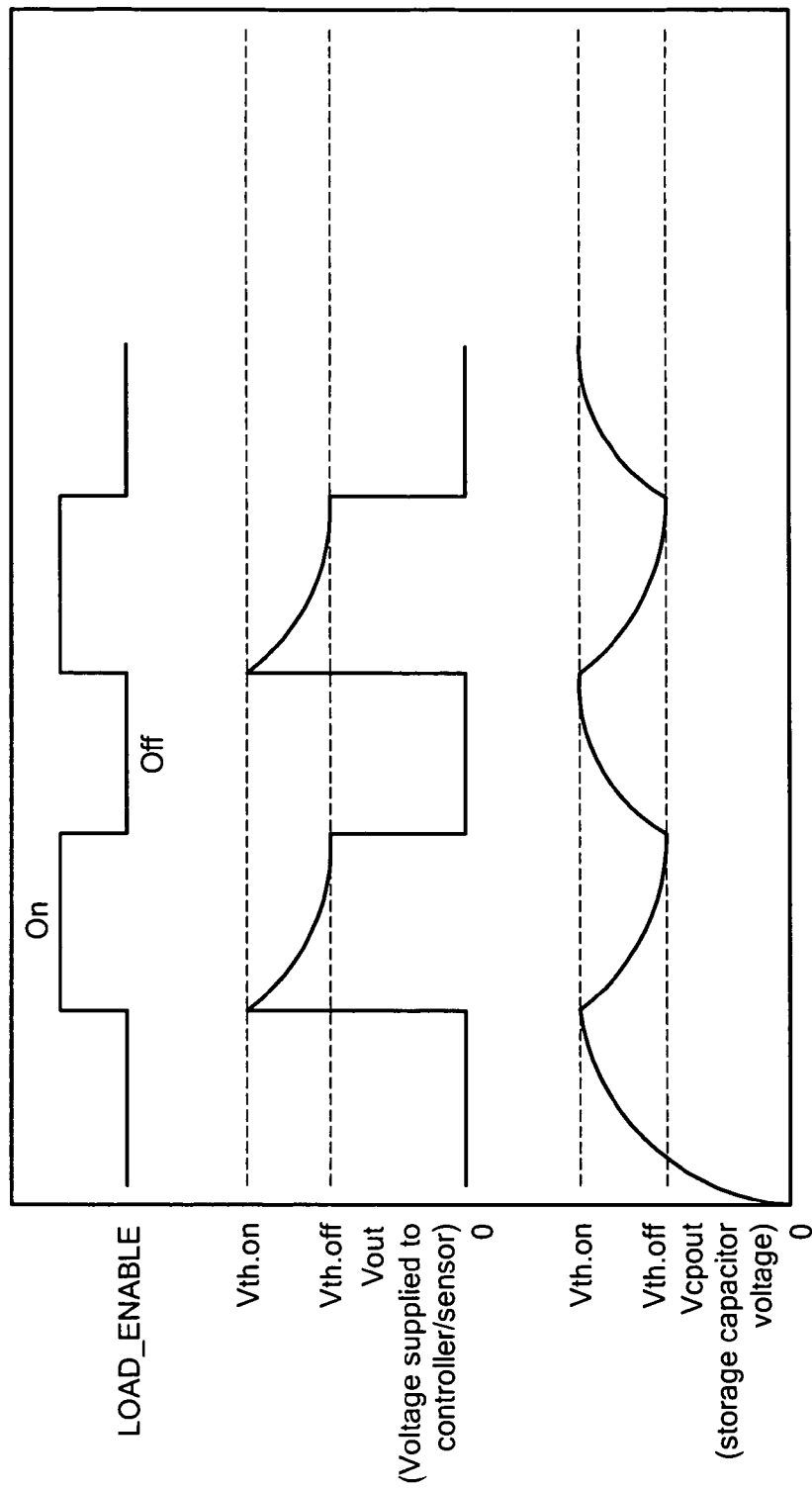
FIG. 6 is a graph showing the various signals of the circuit shown in FIG. 5.

FIG. 6 shows an example of several charge cycles, showing the relevant voltages at several relevant points in the circuit throughout the charge cycles, assuming a constant input power.

Figure 7A:
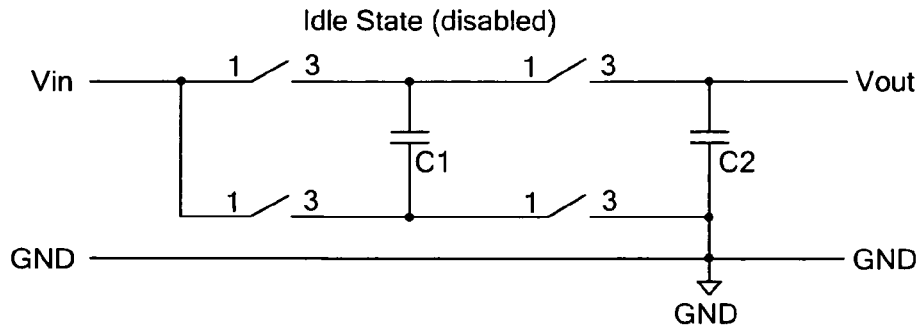
FIGS. 7A-7C are views of the various states of an example of a charge pump as depicted in FIG. 5.
Figure 7B:
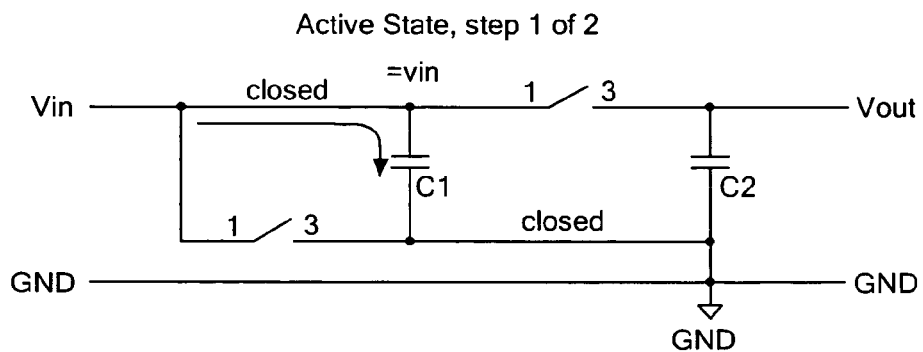
Figure 7C:
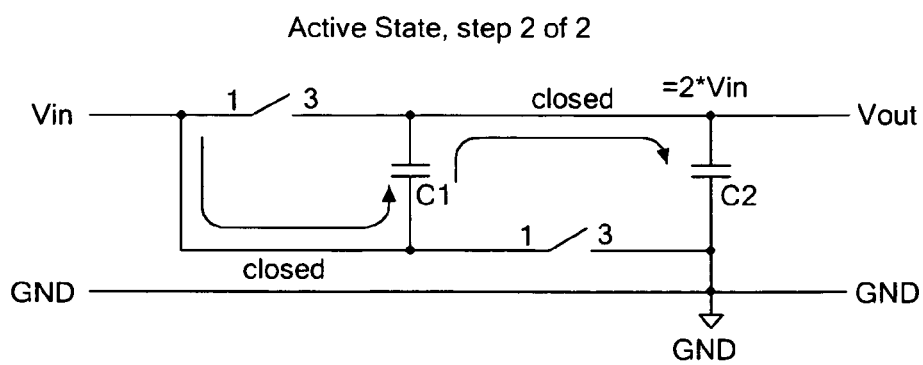

FIGS. 7A-7C show a simplified view of a typical charge pump stage and details of the "charge pump" block in its three possible states using two capacitors and four switches. In FIG. 7A, (idle or disabled state), all switches are open and absolutely nothing happens. No current flows and no voltages change. FIGS. 7B and 7C show the two-step active charge pump process. In the first step, the two switches indicated close, causing capacitor C1 to charge up to the input voltage, Vin. In the second step, these switches open and the opposite two switches close, causing C1 (which now has voltage "Vin" across it) to be connected in series with the input voltage, making the total voltage at its upper terminal (Vin+Vin=2*Vin). As this cycle repeats, capacitor C2 charges to 2*Vin. Higher output voltages are achieved by cascading multiple such stages.

The charge management function controls the voltage and sequencing of the electrical power delivered to the rest of the circuit as shown in FIGS. 5 and 6. A turn-on threshold voltage (Vth.on) and turn-off threshold voltage (Vth.off) are chosen so that the turn-on threshold is higher than the turn-off threshold and both are within the operational range of the downstream circuit (controller 16, sensor 20, transmitter 18, etc.). Rectifier circuit 80, FIG. 5 converts any power (in the form of alternating current, or AC) from power source 10 to direct current, or DC.

When electrical power is initially available at the input, charge pump 82 is in the enabled state and the DC voltage at its input is used to charge storage capacitor 81 (C2) to a higher voltage than the input voltage. When the voltage developed on the storage capacitor exceeds the turn-on threshold, Vth.on, the output of voltage comparator circuit 84 is enabled closing output switch 86 delivering power to the downstream circuit and disabling charge pump 82. The downstream circuit performs its task and continues drawing power until storage capacitor 81 is discharged to the turn-off threshold (Vth.off). When this happens, the output of voltage comparator circuit 84 is disabled opening output switch 86 removing power from the downstream circuit and re-enabling charge pump circuit 82 at which the point the charge cycle repeats. After the transmissions are sent, controller 16 also controls switch 90 (which is normally internal to the controller) to close enabling a load such as a light-emitting diode (LED) 92 to drain capacitor 81 until Vth.off is reached. Use of an LED provides a visual indication that the circuit is operating.

In this way, the packet transmission rate, when it varies beyond a predetermined threshold, relates to an indication of a potential problem with the device under test or being monitored. When the rate drops to zero, then the device under test has stopped working.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the transmitter and/or receiver of FIG. 1 can be embodied in transceivers or in wired as opposed to wireless devices and/or circuits. Also, the functionality of the microcontroller and processor of FIG. 1 can be embodied in numerous different designs, devices, circuits, and the like.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A self-powered sensor system comprising:
   a power source generating power as a function of a first parameter;
   a transmitter for transmitting data;
   a controller configured to control the transmitter to transmit the data;
   a charge management circuit responsive to the power level output by the power source and configured to provide, every charge-then-discharge cycle, a supply signal to the controller which activates the controller to control the transmitter to transmit the data at a transmission rate which is a function of the charge-then-discharge cycle;
   a receiver for receiving the transmitted data; and
   a processor configured to process the transmitted data and the transmission rate and to identify a variation in the first parameter by a variation in the transmission rate beyond a predetermined threshold.

2. The system of claim 1 further including a sensor for sensing a second parameter, the controller further configured to control the transmitter to transmit the second parameter in the data.

3. The system of claim 1 in which the power source includes a piezoelectric element and the first parameter is vibration.

4. The system of claim 1 in which the power includes a voltage and the supply signal output by the charge management circuit includes a turn on voltage.

5. The system of claim 4 in which the charge management circuit includes a storage device charged by the voltage to a turn on voltage over a charge phase of the charge-then-discharge cycle.

6. The system of claim 5 in which the charge management circuit is configured to supply the turn on voltage to the controller.

7. The system of claim 5 in which the charge management circuit further includes a load configured to discharge the storage device over a discharge phase of the charge-then-discharge cycle.

8. The system of claim 6 in which the charge management circuit further includes a comparator circuit configured to determine when the storage device is charged to the turn on voltage.

9. The system of claim 1 in which the controller is further configured to generate a new sequence number each charge-then-discharge cycle transmitted as part of the data.

10. The system of claim 1 in which the processor is configured to address missing sequence numbers in identifying a variation in the first parameter.

11. The system of claim 1 in which the controller is further configured to generate multiple transmissions at different transmitter power levels each charge-then-discharge cycle.

12. The system of claim 11 in which the controller is further configured to include the power levels in the data.

13. The system of claim 12 in which the processor is configured to determine an estimated quality of the transmitter signal.

14. A self-powered sensor system comprising:
    a piezoelectric power source generating supply power which is a function of vibrations imparted to the piezoelectric power source;
    a charge management circuit responsive to the supply power and configured to produce, every charge-then-discharge cycle, a turn-on voltage;
    a sensor for sensing a parameter;
    a transmitter for transmitting data including the sensed parameter;
    a controller enabled in response to the turn-on voltage every charge-then-discharge cycle and configured to control the transmitter to transmit the data at a transmission rate;
    a receiver for receiving the transmitted data; and
    a processor configured to process the transmitted data and the transmission rate and to identify variations in said vibrations by a variation in the transmission rate beyond a predetermined threshold.

15. The system of claim 14 in which the charge management circuit includes a storage device charged by the supply voltage to the turn on voltage over a charge phase of the charge-then-discharge cycle.

16. The system of claim 15 in which the charge management circuit further includes a power drain activated after the charge phase of the charge-then-discharge cycle to discharge the storage element.

17. The system of claim 14 in which the controller is further configured to generate a new sequence number each charge-then-discharge cycle transmitted as part of the data.

18. The system of claim 14 in which the processor is configured to address missing sequence numbers in identifying a variation in the vibrations.

19. The system of claim 14 in which the controller is further configured to generate multiple transmissions each charge-then-discharge cycle at different transmitter power levels.

20. The system of claim 19 in which the controller is further configured to include the power levels in the data.

21. The system of claim 20 in which the processor is configured to determine an estimated quality of the transmitter signal.

22. A sensing method comprising:
generating power as a function of a first parameter;
activating a transmitter to transmit, every charge-then-discharge cycle, data at a transmission rate which is a function of the charge-then-discharge cycle;
receiving the transmitted data;
processing the transmitted data; and
identifying a variation in the first parameter by a variation in the transmission rate beyond a predetermined threshold.

23. The method of claim 22 further including sensing a second parameter and transmitting the second parameter in the data.

24. The method of claim 22 in which the first parameter is vibration.

25. The method of claim 22 in which activating the transmitter to transmit includes using the generated power to charge a storage device to a level sufficient to activate the transmitter at the end of a charge phase of the charge-then-discharge cycle.

26. The method of claim 25 further including the step of draining the storage device at the end of each charge phase of the charge-then-discharge cycle.

27. The method of claim 25 further including the step of generating a sequence number each charge cycle transmitted as part of the data.

28. The method of claim 25 further including processing the sequence number and addressing variations in the first parameter in response to missing sequence numbers.

29. The method of claim 22 further including the step of generating multiple transmissions at different power levels each charge/discharge cycle.

30. The method of claim 29 further including the step of indicating the power level in the data.

31. The method of claim 30 further including the step of estimating transmitter signal quality.

32. A sensor method comprising:
generating power as a function of vibrations imparted to a piezoelectric power source;
providing, every charge-then-discharge cycle, in response to the power, a turn-on voltage sufficient to operate a transmitting device;
transmitting data every charge phase of the charge-then-discharge cycle at a transmission rate;
receiving the transmitted data; and
processing the data and the transmission rate and identifying variations in vibrations by a variation in the transmission rate beyond a predetermined threshold.

* * * * *